Figure 1:
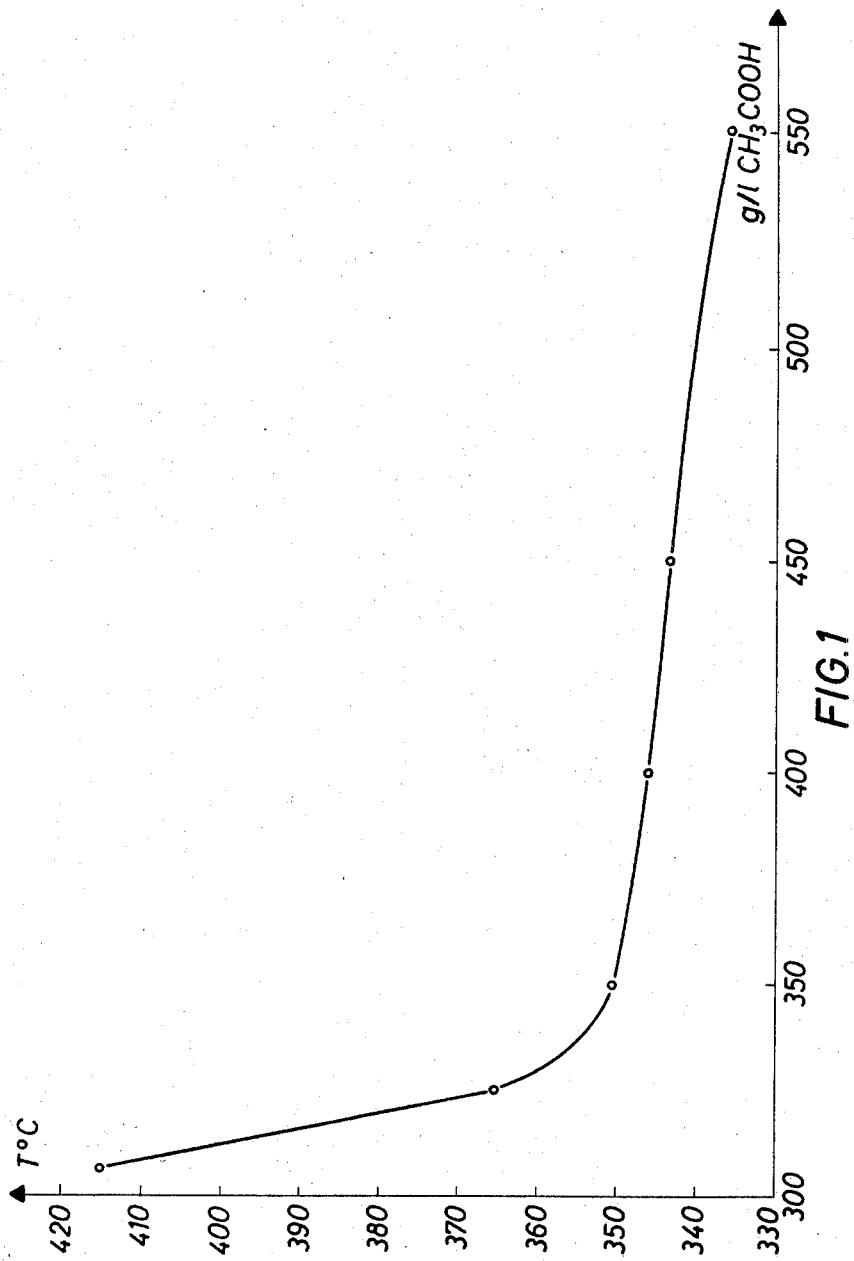

United States Patent Office 3,378,583
Patented Apr. 16, 1968

3,378,583
INDUSTRIAL MANUFACTURE OF KETENE
AND ACETIC ANHYDRIDE
Gustaaf Edmond van Bogaert, Westerloo, Belgium, assignor to Gevaert Photo-Producten N.V., Mortsel, Belgium, a Belgian company
Continuation-in-part of application Ser. No. 255,733, Jan. 30, 1963. This application Nov. 30, 1965, Ser. No. 510,528
5 Claims. (Cl. 260—547)

The present application is a continuation-in-part of the U.S. patent application Ser. No. 255,733 filed Jan. 30, 1963, now abandoned.

This invention relates to an improved industrial process and installation for the manufacture of ketene.

It is known that ketene is industrially manufactured by thermally splitting acetic acid vapor in the presence of catalysts to form ketene and water, and seperating the ketene from the water by cooling or cooling and absorption.

The manufacture of ketene by thermal dehydration of anhydrous acetic acid is industrially applied to a great extent for the preparation of acetic anhydride which is formed by the reaction of anhydrous acetic acid with ketene.

As described in the French patent specification 777,483, the mixture of ketene and water obtained by thermal decomposition of acetic acid should be cooled rapidly in order to avoid that the ketene recombines with the water which has been split off to form again acetic acid. The rapid cooling of the mixture of ketene and water vapor is generally carried out by means of a brine-cooler without recovery of a part of the calories which were supplied for thermally splitting the acetic acid. This rapid cooling requires a cooling device with a very high capacity especially in installations lacking a heat recovering system. Obviously, by this rapid cooling, a large amount of the calories supplied for the decomposition of the acetic acid is lost in the cooling device which means that the energy necessary for the formation of the acetic anhydride is not economically utilized.

It is an object of the present invention to increase the output of an installation for thermal dehydration of aliphatic acids, more particularly to increase the output of an installation for the manufacture of ketene and acetic anhydride by the thermal dehydration of acetic acid.

This object is accomplished by a method of heat-recovery and apparatus wherein heat-exchange takes place between the thermal dehydration products resulting from the thermal decomposition of an aliphatic acid, more particularly acetic acid, and the vapors of said acid entering the thermal dehydration reactor.

The method of heat-recovery according to this invention is characterized thereby, that heat from the thermal dehydration mixture which comprises ketene and water vapor is recovered without any essential recombination of ketene with water. This is realized in a heat-exchanger by the transfer of heat from the thermal dehydration mixture leaving the reactor, to the entering acetic acid vapor, during which process care is taken that the temperature of the thermal dehydration mixture, wherein ketene and water vapor are in direct contact, does not decrease below 350° C. and that their contact time at this temperature does not exceed 0.4 sec.

Although an advantageous heat exchange without any appreciable recombination of the ketene with the water vapor is possible in the thermal dehydration mixture, the lowest temperature of the latter in the heat-exchanger, however, is preferably chosen at 360° C. The reason is that this temperature allows a more stable operation of the installation as a result of the longer permissible contact time of ketene and water vapor before the recombination impairs the efficiency of the installation. The contact time at 360° C. of ketene and water vapor in the dehydration mixture should preferably not exceed 0.8 sec. So, a substantial loss of ketene by recombination with water vapor is avoided. The temperature region, wherein heat of the thermal dehydration mixture is transferred to the acetic acid vapor entering the dehydration reactor is preferably comprised between 750° and 360° C. For a heat recovery without recombination above 360° C., the contact time between ketene and water vapor may be doubled for each increase of 10° C. beyond 360° C.

The dehydration can take place over a wide range of temperature, the most useful range being generally 500–1000° C. It must be noticed, however, that the temperature at which dehydration takes place depends upon the catalyst used and upon the pressure applied in the dehydration system.

The dehydration process is preferably carried out under reduced pressure. If triethyl phosphate is chosen as catalyst, the temperature of the dehydration reactor amounts preferably to 750° C. at a pressure of 300 mm. Hg.

As has been stated in practice, the insertion of a heat exchanging system in an installation for the manufacture of acetic anhydride from ketene working under the conditions as described above and wherein rapid cooling for the separation of the ketene from the water vapor is applied, can increase by 25% the production of acetic anhydride for the same input of thermal energy.

This results also from the study of the heat balance, whereby it has been stated that in the above mentioned temperature region (750°–360° C.) and with the indicated contact time, practically no exothermic reaction takes place between the ketene and the water vapor in the thermal dehydration mixture.

In order to illustrate the temperature relationship of the recombination of water vapor and ketene formed by dehydration of acetic acid vapor, results of experiments are set forth in FIG. 1 which represents a diagram, wherein the acetic acid formed by recombination and calculated in grams per liter of ketene, collected in liquid state after having passed the brine cooler of an industrial ketene producing plant, is plotted against the temperature (° C.) of the ketene-water mixture at the end of the heat exchanger connected to the dehydration reactor.

From that diagram can be seen clearly that at 360–350° C. the recombination of ketene and water vapor suddenly increases.

In these tests the rate of supply of the acetic acid vapors to be pyrolized was kept constant.

From the comparison of the specific heats of ketene, water vapor and acetic acid, it can be proved that a very economic heat transfer to the acetic acid is possible in the temperature region from 95 to 240° C.

The explanation of the good heat absorption of the acetic acid in this temperature region can be found in its rather high specific heat in said temperature region. This is probably connected with the absorption of dissociation energy necessary for the dissociation of bimolecular acetic acid to its monomolecular form. Since the acetic acid possesses a high specific heat especially round 100° C. viz, 1.474 Kcal./kg. ° C. it is extremely interesting to carry out heat recovery with acetic acid vapors of about 100° C. Data concerning the specific heats of ketene, water vapor and acetic acid are mentioned in the review "Verein Deutscher Ingenieure," Wärmeatlas, 1953, p. DC11 and DC15.

Before entering the heat exchanger, the anhydrous acetic acid used as starting product normally is vaporized and preheated in a steam-heated vaporizer.

The heat exchange between the acetic acid vapors and the dehydration mixture consisting of ketene and water vapor is preferably carried out according to the countercurrent principle. As heat exchanger an externally thermally insulated pair of tubes which are concentrically set up is preferably used because of its simplicity and the small resistivity to the vapors flowing through it.

A small resistivity for the heat exchanging vapors is important in view of the short contact time of the ketene and water vapor below 360° C. After leaving the dehydration reactor, the dehydration mixture flows through the interior tube of this heat exchanger whereas the acetic acid vapors flow in countercurrent through the space between both tubes to the dehydration reactor.

According to a preferred embodiment of the process for manufacturing ketene according to the present invention and thus for manufacturing acetic anhydride, the temperature of the dehydration mixture leaving the dehydration reactor is preferably 700° C., and the heat exchange between said dehydration mixture and the acetic acid vapor entering the heat exchanger at 95° C. takes place. Thereby the temperature of the dehydration mixture decreases till 380° C. and the acetic acid, before entering the dehydration oven, is preheated till about 225° C. After the acetic acid vapor leaves the heat exchanger and before it enters the dehydration oven, triethyl phosphate is atomized therein as a catalyst. At this temperature, a very good distribution is obtained. The necessary heat in the reactor for dehydration is supplied by electric heating elements.

The whole process is preferably carried out under reduced pressure e.g. 300 mm. Hg, which is maintained by a vacuum installation inserted after the heat exchanger and the brine cooler, which is used for separating the water from the ketene by rapid cooling.

Attention should be drawn to the fact that it is possible to insert the heat exchanging system according to the present invention in any installation for the manufacture of ketene and acetic anhydride by thermal dehydration, if the precautions indicated above are taken into account. The temperature of dehydration, the catalyst, the pressure and the type of heat exchanger may vary.

For usual catalysts and dehydration temperatures, the United States patent specification 2,295,644 filed December 20, 1938, by L. Fallows and E. V. Mellers is referred to.

For the thermal dehydration of other aliphatic acids than acetic acid, e.g. propionic acid and butyric acid, the same system of heat exchange can improve the output of their dehydration without risk of recombination.

Figure 2:
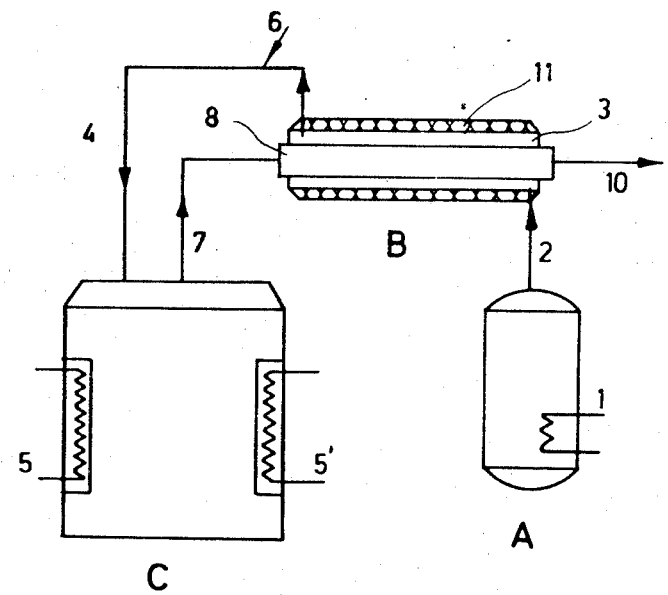

By means of the diagrammatic drawing represented in FIG. 2 the course of the heat exchange in a manufacturing installation for acetic anhydride by dehydration of acetic acid is elucidated.

Anhydrous acetic acid is vaporized in a vaporizer A by means of a steam heating element 1. The acetic acid vapor flows through the conduit 2 in the space between the two concentric tubes 3 and 8 of the heat exchanger B which is externally thermally insulated by an insulating jacket 11. When passing through the heat exchanger B, the acetic acid vapors are preheated by the dehydration mixture. After preheating, the acetic acid vapors flow through the conduit 4 and in said conduit through the dehydration oven C which is provided with the electric heating elements 5 and 5'. Before entering the dehydration oven C, the necessary amount of catalyst is added to the acetic acid vapor by means of the injector 6. The dehydration mixture leaves the dehydration oven along the conduit 7 and flows, while transferring heat to the acetic acid vapors, through the interior tube 8 of the heat exchanger B. After leaving the heat exchanger B, the cooled dehydration mixture flows through the conduit 10 to a cooling device which is connected to a vacuum installation by means of a separator and an absorption apparatus. The purpose of the cooling device is to separate the water vapor and a small amount of non decomposed and recombined acetic acid from the ketene which is collected in anhydrous acetic acid to form acetic anhydride.

I claim:

1. In a process for the manufacture of ketene and acetic anhydride by thermal dehydration of acetic acid vapor at a temperature of between 500 and 1000° C., the step of passing the thermal dehydration mixture comprising ketene and water vapor through a heat exchanger in heat transfer relationship with the acetic acid vapor feed, the thermal dehydration mixture being cooled in said heat exchanger to a temperature not lower than 350° C. and the ketene being in contact with the water vapor for at most 0.4 sec. at 350° C.

2. In a process for the manufacture of ketene and acetic anhydride by thermal dehydration of acetic acid vapor, the step of passing the thermal dehydration mixture comprising ketene and water vapor through a heat exchanger in heat transfer relationship with the acetic acid vapor feed, the thermal dehydration mixture being cooled in said heat exchanger to a temperature not lower than 360° C. and the ketene being in contact with the water vapor for at most 0.8 sec. at 360° C.

3. In a process for the manufacture of ketene and acetic anhydride according to claim 1, said acetic acid feed having a temperature of at least 95° C. when entering said heat exchanger.

4. In a process for the manufacture of ketene and acetic anhydride according to claim 2, the cooling by heat exchange with the acetic acid vapor of the thermal dehydration mixture being carried out in said heat exchanger in a temperature interval comprised between 750° C. and 360° C.

5. In a process for the manufacture of ketene and acetic anhydride according to claim 2, the cooling of the thermal dehydration mixture being carried out in said heat exchanger in a temperature interval comprised between 750° C. and 360° C. and at a pressure of 300 mm. Hg.

References Cited

UNITED STATES PATENTS

| | | | |
|---|---|---|---|
| 2,034,714 | 3/1936 | Dreyfus | 260—547 |
| 2,856,426 | 10/1958 | Estabrook | 260—547 |
| 3,136,811 | 6/1964 | Painter et al. | |

LORRAINE A. WEINBERGER, *Primary Examiner.*

RICHARD K. JACKSON, *Examiner.*

PAUL KILLOS, *Assistant Examiner.*